United States Patent [19]

Buchanan et al.

[11] 4,302,791

[45] Nov. 24, 1981

[54] POWER SUPPLY SEQUENCING APPARATUS

[75] Inventors: James E. Buchanan, Bowie; Daniel G. Damon, Laurel, both of Md.

[73] Assignee: The United States of America as represented by the Secretary of the Air Force, Washington, D.C.

[21] Appl. No.: 77,058

[22] Filed: Sep. 19, 1979

[51] Int. Cl.³ .................. H02H 3/24

[52] U.S. Cl. .................. 361/86; 307/85; 361/90; 361/92

[58] Field of Search .................. 361/86, 88, 90, 92, 361/77; 307/86, 85, 87, 127, 251

[56] References Cited

U.S. PATENT DOCUMENTS

| | | | |
|---|---|---|---|
| 3,489,919 | 1/1970 | Wolterman | 361/86 |
| 3,518,986 | 7/1970 | Woods et al. | 307/86 X |

*Primary Examiner*—J. D. Miller
*Assistant Examiner*—Reinhard J. Eisenzopf
*Attorney, Agent, or Firm*—Donald J. Singer; William Stepanishen

[57] ABSTRACT

A power supply sequencing apparatus utilizing a pair of MOS-FET devices to simultaneously apply or remove the positive and negative power supply sources to an electronic unit.

7 Claims, 3 Drawing Figures

POWER SUPPLY SEQUENCING APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to a power supply control apparatus, and in particular to a power supply sequency apparatus. It is quite common to simultaneously power electronic devices with positive and negative power supply sources. However, where one of the power supply sources is shut down either intentionally or due to some overload or safety condition, the other power supply source is not necessarily shut down. Therefore, an electronic device which is powered by these supplies in the situation, is subjected to an unusual condition. The shutting down of the one of the voltages due to an overload or whatever thereof without shutting down the other voltages is undesirable since a portion of the electronic circuitry will continue to be energized when a portion will be shut down. The partial energization of the common circuitry may lead to destruction of part of the circuitry and is therefore quite undesirable.

In the prior art, the approach to power supply sequencing problems has seen the use of double pole relays assuming in the situation with a two supply device, to apply the power simultaneously to the critical component. Such an arrangement, however, requires some type of sense circuitry to detect the failure at one of the supplies and deenergize or prevent the energization of the relay in case of a failure or other absence of either supply. It is clear that obviously the additional sense circuitry complicates the overall system, is expensive, power consuming, lowers the overall reliabiity and in general the relay approach is not compatible with modern integrated circuitry. Bipolar transistor switches have also been used in place of relay contacts but their application suffers from most of the same complications mentioned above.

SUMMARY OF THE INVENTION

The present invention utilizes a pair of MOS-FET devices to protect electronic devices that are powered by voltage sources of opposite polarity which require that the voltage be applied and/or removed simultaneously or in a particular sequence. The enhancement mode MOSFETs not only switch one branch of the voltage sources but to also sense the state of the opposite polarity source.

The gates of the two MOSFETs are cross coupled to the opposite polarity power supply so as not to allow the application of one supply voltage to the device unless the other supply voltage is present, and to cut off one supply if the other fails. In another application, one supply voltage to the electronic device, before the application of the other supply voltage, is controlled by a single MOSFET switch which is inserted between one power supply and the electonic device with the gate coupled to the opposite polarity power supply. The MOSFET allows the application of one supply voltage on conduction caused by presence of the opposite polarity supply voltage.

It is one object of the present invention, therefore, to provide an improved power supply sequencing apparatus to simultaneously apply and remove supply voltages to a device using voltage sources of opposite polarity.

It is another object of the invention to provide an improved power supply sequency apparatus to apply supply voltages to a device using voltage sources of opposite polarity in particular predetermined sequence.

It is still another object of the invention to provide an improved power supply sequencing apparatus capable of switching one branch of the voltage source pair of opposite polarity.

It is yet another object of the invention to provide an improved power supply sequencing apparatus to sense the state of each opposite polarity voltage source. These and other advantages, objects and features of the invention will become more apparent after considering the following description taken in conjunction with the illustrative embodiment in the accompanying drawings.

DESCRIPTION OF THE PREFERRED EMBODIMENT

Figure 1:
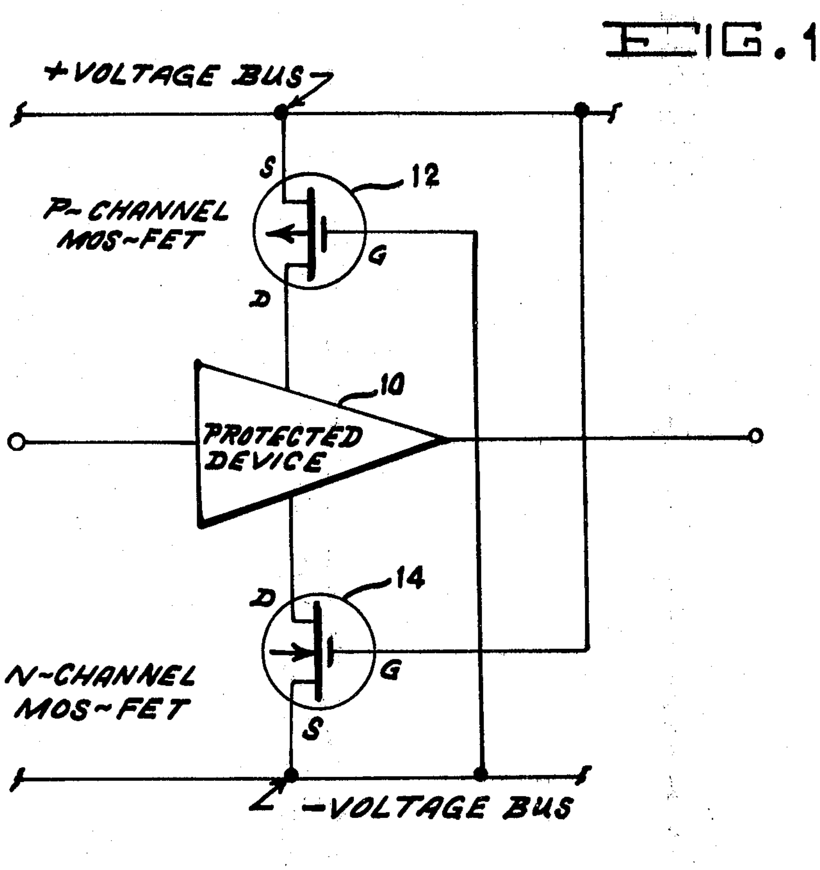
FIG. 1 is a schematic diagram for applying and removing two power supply voltages simultaneously.

Referring now to FIG. 1, there is shown a power supply sequencing apparatus for simultaneously applying a pair of supply voltages of opposite polarity or different voltages to an electronic component or device 10. The power supply sequencing apparatus may also be utilized to simultaneously remove the supply voltages from the device 10. The protected device 10 which may be any electronic circuit, such as any integrated circuit requiring a pair of supply voltages of opposite polarity or an operational amplifier or some other such circuit, is connected to the respective supply buses by field effect transistors hereinafter referred to as FETS) 12 and 14. In the present apparatus, the FET 12 is connected between the positive voltage bus and the positive voltage supply terminal of protected device 10. The FET 12 is arranged such that the source terminal, S, is connected to the positive voltage bus and the drain terminal, D, is connected to the positive voltage supply terminal of the protected device 10. The gate, G, of FET 12 is connected to the negative voltage supply bus. The negative voltage supply is applied through FET 14 to the negative voltage supply terminal of the protected device 10. The source terminal, S, of FET 14 is connected to the negative voltage bus, while the drain terminal, D, is connected to the negative voltage supply terminal of the protected device 10.

The circuit shown in FIG. 1 operates as follows: the P channel MOS FET 12 in the positive supply line requires a negative gate voltage at its gate G to turn ON and the N-channel unit 14 in the negative supply line requires a positive gate voltage at its gate G to turn ON. The FETs are selected such that the threshold voltage or turn-on voltage for the units is near the difference of the positive and negative supply voltage. With the present arrangement and devices, the opposite polarity voltage supply as well as the voltage supply that is being controlled, must be near its rated value before a given FET can turn ON. Thus, the cross-coupled FETs do not allow the application of one supply unless the other exists, and likewise if one supply fails the other is immediately cut off.

Figure 2:
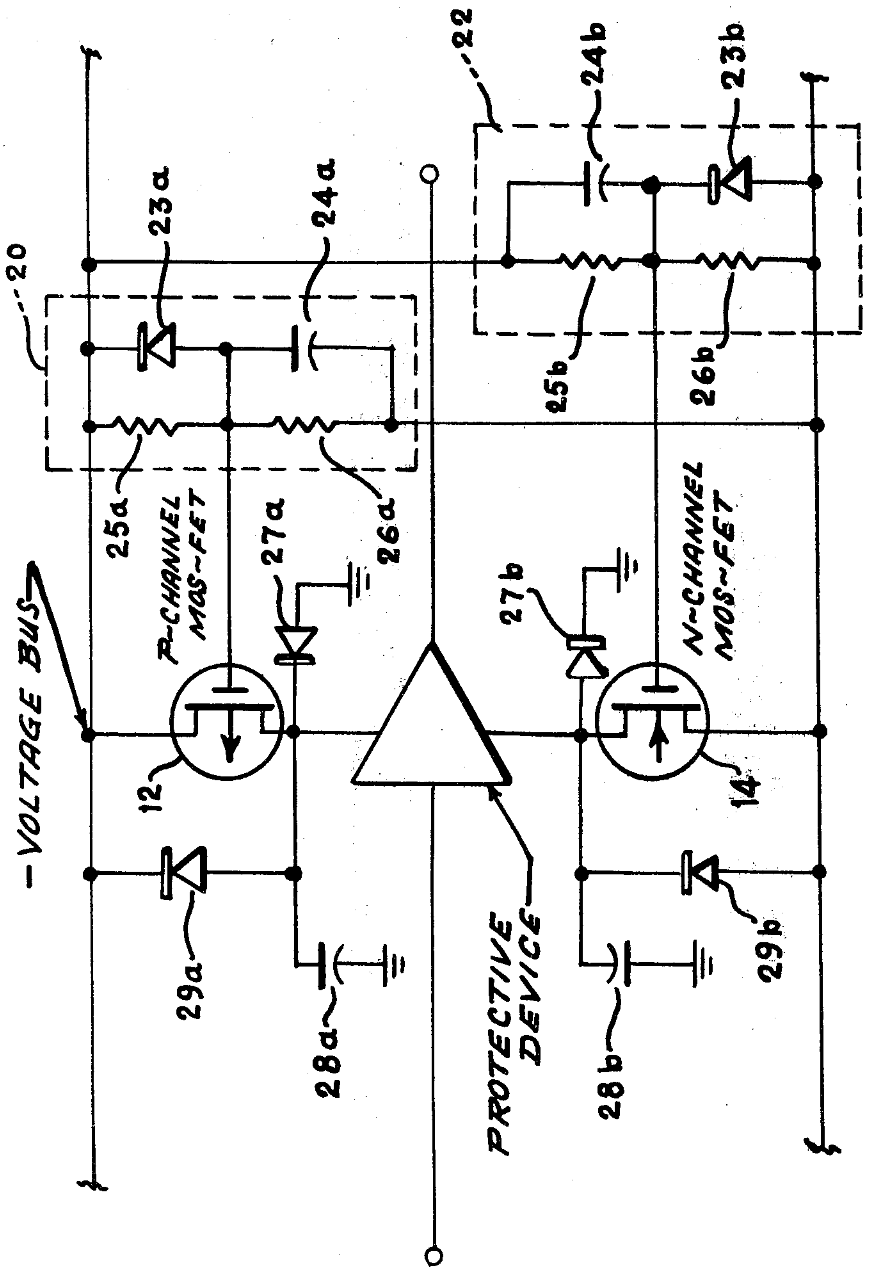
FIG. 2 is a schematic diagram power supply sequencing circuit in accordance with the present invention.

Turning now to FIG. 2, there is shown a complete power supply sequencing apparatus including threshold setting networks for the power supply FETs. The present circuit is the same as shown in FIG. 1 except that a threshold setting network 20 is provided for FET 12 and a threshold setting network 22 is provided for FET 14. Each threshold setting network 20,22 contains respectively a diode 23*a,b* for fast discharge; a turn-on delay capacitor 24*a,b,* and level setting resistors 25*a,* 26*a* and 25*a,* 26*b*. In addition, each FET 12, 14 respectively has diode 27*a,* 27*b* that is connected as shown between the drain and the protected device to ground, to reduce the voltage rating requirements of the FET. Further included are decoupling capacitors 28*a,b* and diodes 29*a,b* for the respective fast discharge of the decoupling capacitors.

The dividers which are part of the threshold setting networks 20, 22, are attached to the gates of the FETs to meet the threshold requirements of available FETs. The addition of the capacitor in the gate divider will allow the turn on timing to be controlled. The capacitor may also be used to compensate for a slightly slower device in one leg or for a supply that turns-On slower than the other one. Also, if the device being protected favors having one supply applied slightly before the other, the sizing of the capacitors and dividers may be selected to control the turn-On sequence. It should be noted that in those cases where one supply is allowed to be applied first, no FET is required in that branch of the supply; only one in the opposite lead is required.

Figure 3:
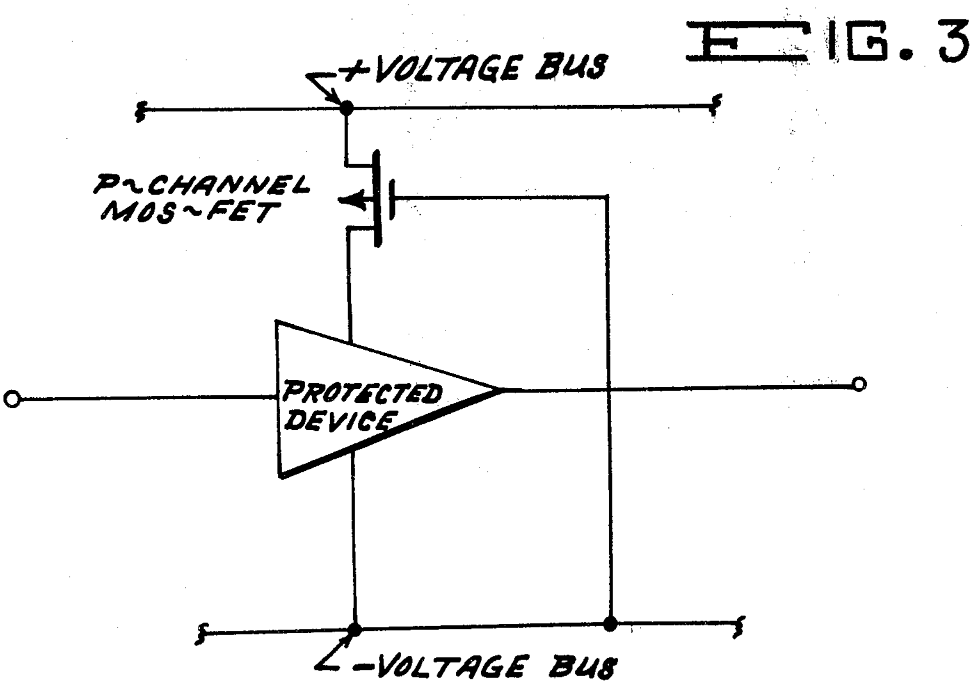
FIG. 3 is a schematic diagram of a power supply sequencing circuit for the application of negative supply voltage before the positive supply voltage.

There is shown in FIG. 3 the case just discussed wherein the negative voltage is allowed to be applied first. In all the applications shown and discussed, additional FETs may be paralleled with those shown in order to increase the current capacity for the particular circuit or device. Furthermore, diodes may be added as shown in FIG. 2 to speed up the turn-Off of the FET and to provide a discharge path for any decoupling capacitors that may be used.

Although the invention has been described with reference to a particular embodiment, it will be understood to those skilled in the art that the invention is capable of a variety of alternative embodiments within the spirit and scope of the appended claims.

What is claimed is:

1. A power supply sequencing apparatus to simultaneously control the application or removal of supply voltages of opposite polarity to an electronic device comprising in combination:

a first and second voltage supply means, said first and second voltage supply means being of opposite polarity, and, a first amplifier and a second amplifier, said first amplifier including a first main conduction path and a first control electrode, said first control electrode controlling the current flowing through said first main conduction path, said second amplifier including a second main conduction path and a second control electrode, said second control electrode controlling the current flowing through said second main conduction path, the current flowing through said first and second main conduction paths being controlled in the same direction by signals of opposite polarities applied to said first and second control electrodes, said first control electrode is directly connected to said second voltage supply means, said second control electrode is directly connected to said first voltage supply means, said first main conduction path being connected from said first voltage supply means to said electronic device, said second main conduction path being connected from said electronic device to said second voltage supply means.

2. A power supply sequencing apparatus as defined in claim 1 wherein each of said first and second amplifiers comprises a solid state amplifier.

3. A power supply sequencing apparatus as described in claim 2 wherein each of said first and second amplifiers comprises a field effect transistor.

4. A power supply sequencing apparatus as defined in claim 1 wherein each of said first and second amplifiers comprises a field effect transistor.

5. A power supply sequencing apparatus as described in claim 1 further including a first and second threshold setting means, said first and second threshold setting means being connected directly between said first and second voltage supply means, said first threshold setting means providing a first bias signal to said first control electrode, said second threshold setting means providing a second bias signal to said second control means.

6. A power supply sequencing apparatus as described in claim 1 wherein said first amplifier is a P-channel MOS-FET.

7. A power supply sequencing apparatus as described in claim 1 wherein said second amplifier is a N-channel MOS-FET.

* * * * *